United States Patent
Eder et al.

(10) Patent No.: US 11,506,516 B2
(45) Date of Patent: Nov. 22, 2022

(54) SCANNING UNIT AND ROTARY ENCODER EQUIPPED THEREWITH

(71) Applicant: DR. JOHANNES HEIDENHAIN GmbH, Traunreut (DE)

(72) Inventors: Peter Eder, Nußdorf (DE); Josef Thaler, Traunreut (DE); Dirk Ahrendt, Traunstein (DE); Alois Brandl, Siegsdorf (DE); Thomas Jäger, Traunstein (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 17/348,196

(22) Filed: Jun. 15, 2021

(65) Prior Publication Data

US 2021/0396552 A1 Dec. 23, 2021

(30) Foreign Application Priority Data

Jun. 22, 2020 (EP) .................................... 20181310

(51) Int. Cl.
*G01D 5/20* (2006.01)

(52) U.S. Cl.
CPC ..................... *G01D 5/20* (2013.01)

(58) Field of Classification Search
CPC .... G01D 5/20; G01D 5/24433; G01D 11/245; G01D 5/204
See application file for complete search history.

(56) References Cited

U.S. PATENT DOCUMENTS

| | | | |
|---|---|---|---|
| 5,084,791 A * | 1/1992 | Thanos | G11B 5/5556 |
| 2008/0238267 A1* | 10/2008 | Scharrer | H02K 11/22 310/68 B |
| 2010/0156402 A1* | 6/2010 | Straubinger | G01D 5/2225 324/207.25 |
| 2014/0021944 A1* | 1/2014 | Niarfeix | G01P 3/443 324/207.25 |
| 2015/0241778 A1* | 8/2015 | Kato | G03F 7/20 355/67 |

(Continued)

FOREIGN PATENT DOCUMENTS

| DE | 102007014781 B3 | 5/2008 |
|---|---|---|
| DE | 102018202239 A1 | 8/2019 |

(Continued)

*Primary Examiner* — Akm Zakaria
(74) *Attorney, Agent, or Firm* — Carter, DeLuca & Farrell LLP

(57) ABSTRACT

A scanning unit is arranged to scan a scale element that is rotatable about an axis relative to the scanning unit. The scanning unit includes a circuit board, which includes a substrate having a first surface, a second surface arranged opposite the first surface, and a circumferential third surface. A transducer system is arranged on the first surface, and electronic components are mounted on the second surface. The third surface includes a plurality of concave indentations. The scanning unit furthermore includes a metal frame having an uninterrupted first recess, which is radially restricted by an inner side of the metal frame, the inner side having a plurality of inwardly projecting elements. The inwardly projecting elements engage with the concave indentations such that the substrate is fixed in place in the metal frame under mechanical tension.

22 Claims, 4 Drawing Sheets

(56) References Cited

U.S. PATENT DOCUMENTS

2018/0375405 A1* 12/2018 Saito .................. G01D 5/24433
2019/0179028 A1*  6/2019 Pacala ................. G01S 7/4865
2019/0250012 A1   8/2019 Thaler et al.
2020/0292360 A1*  9/2020 Kettering ............... G01D 5/145

FOREIGN PATENT DOCUMENTS

EP   2674764 A1   12/2013
EP   3505258 A1    7/2019

* cited by examiner

SCANNING UNIT AND ROTARY ENCODER EQUIPPED THEREWITH

CROSS-REFERENCE TO RELATED APPLICATIONS

The present application claims priority to Application No. 20181310.2, filed in the European Patent Office on Jun. 22, 2020, which is expressly incorporated herein in its entirety by reference thereto.

FIELD OF THE INVENTION

The present invention relates to a scanning unit, for scanning a scale element that is rotatable relative to the scanning unit, and to a rotary encoder equipped with such a scanning unit.

BACKGROUND INFORMATION

For example, certain rotary encoders are used as angle encoders for determining the angular position of two machine parts that are rotatable relative to each other.

In certain inductive rotary encoders, excitation circuit traces and receiver tracks, such as in the form of circuit traces, are applied on a shared, e.g., multi-layer circuit board, which is fixedly connected to a stator of a rotary encoder, for example. Situated across from this circuit board is a scale element on which graduation structures are applied and which is connected to the rotor of the rotary encoder in a torsionally fixed manner. If an electrical excitation current that varies over time is applied to the excitation coils, signals that are a function of the angular position are generated in the receiver coils during the relative rotation between the rotor and the stator. These signals are further processed in an evaluation electronics.

In certain rotary encoders operating according to an optical principle, a light beam is reflected at a rotatable disk provided with graduation structures, whereupon the reflected and modulated light is received by a light detector. The received light intensity includes the information about the relative angular position.

Such rotary encoders are often utilized as measuring devices for electrical drives, for the purpose of determining the relative movement or the relative position of corresponding machine parts. In this case, the generated angular position values are conveyed to subsequent electronics for the actuation of the drives via a corresponding interface system.

German Patent Document 10 2018 202 239, and U.S. Pat. No. 10,989,569, describe an angle encoder having an annular circuit board for scanning an angle scale. The circuit board is fixed in place on a step of a housing of the angle encoder.

SUMMARY

Example embodiments of the present invention provide a scanning unit that may be produced in an economical manner and has a compact configuration yet still makes it possible to attain a high measuring accuracy.

According to an example embodiment of the present invention, a scanning unit is adapted to scan a scale element that is rotatable relative to the scanning unit about an axis, the scanning unit including a metal frame and a circuit board. The circuit board includes a substrate which has a first surface, a second surface arranged opposite the first surface, and a circumferential third surface. A transducer system or sensor system is arranged on the first surface. Mounted at or on the second surface are electronic components. The third surface has multiple concave indentations. The metal frame has an uninterrupted first recess, which is radially restricted by an inner side of the metal frame, the inner side having multiple inwardly projecting elements. The inner side of the metal frame encloses the indentations of the circumferential third surface of the substrate. The inwardly projecting elements engage with the concave indentations such that the substrate is fixed in place in the metal frame under mechanical tension.

More specifically, the uninterrupted first recess should be understood as a recess without a step, which thus means that along each line parallel to the axis on the inner side of the recess, the radial clearance from the axis for one and the same line always has the same size.

In this context, the mechanical tensions result especially from radially oriented forces, i.e., from clamping forces in the direction of the axis.

In addition to the described clamping as a result of the generated mechanical tensions, the substrate may also be fixed in place or secured by a redundant adhesive connection.

The scanning unit may have four inwardly projecting elements, which engage with the concave indentations such that the circuit board or the substrate is fixed in place in the metal frame under mechanical tension.

The inwardly projecting elements may have an edge or blade that extends in parallel with the axis in each case.

The metal frame may be arranged in the form of a disk or may have an annular shape in a first approximation. The metal frame thus, for example, is arranged in the form of an approximate hollow cylinder whose diameter is many times greater than its thickness. In particular, the metal frame is pressed out of a flat plate so that the annular cover surfaces or the end faces of the metal frame have no projecting regions. Instead, the end faces of the metal frame have a level and parallel orientation relative to one another. The metal frame may have a circumferentially closed configuration. If necessary, however, it may also have a configuration that is not closed and therefore has a gap whose gap width extends in the circumferential direction.

The end faces (e.g., the annular cover faces) of the metal frame are otherwise arranged orthogonal to the axis.

The inner side of the metal frame and the circumferential outer side or outer contour of the metal frame are point-symmetric in relation to one and the same point, which, for example, is located on the axis.

The metal frame may have a first extension in a direction perpendicular to the axis, which may be considered the diameter or the maximum diameter. In addition, the metal frame may have a second extension in the direction of the axis, which may also be referred to as the thickness. The first extension is, for example, at least five times greater than the second extension, e.g., at least ten times greater, and, more particularly, at least twelve times greater.

The metal frame may have a substantially circular outer contour.

The circuit board may be arranged in the metal frame such that the metal frame has a first axial protrusion in relation to the first surface of the substrate.

The circuit board may be arranged in the metal frame such that the metal frame has a second axial protrusion in relation to the second surface of the substrate. However, it is also possible that the electronic components project beyond the contour of the metal frame in the direction of the axis.

The metal frame may have second recesses, which may be arranged in the form of bores, for the fastening to a machine part. In addition, the scanning unit may include fastening elements which penetrate the second recesses, the fastening elements each having a section that projects inwardly over the substrate. As a result, the fastening elements are not only able to fix the metal frame in place but also achieve an axial securing of the circuit board at the same time.

The metal frame may have a second extension (thickness of the metal frame) in the direction of the axis, and the substrate has a third extension (thickness of the substrate) in the direction of the axis, the second extension being greater than the third extension.

According to an example embodiment of the present invention, a rotary encoder includes a scanning unit and a scale element, the first surface of the substrate being arranged opposite the scale element at a distance that extends in the direction of the axis.

Rotary encoders that include integral bearings are differentiated from rotary encoders without integral bearings, e.g., also referred to as bearingless rotary encoders. Rotary encoders that include integral bearings usually have relatively small rolling bearings so that the component groups that are rotatable relative to one another are arranged in a defined axial and radial position relative to one another within the particular rotary encoder. In the case of bearingless rotary encoders, on the other hand, attention must be paid during the installation on a machine that the component groups that are rotatable relative to one another are fixed in place in the correct position, e.g., at the correct axial distance from one another.

The rotary encoder described herein is, for example, arranged as a bearingless rotary encoder.

Further features and aspects of example embodiments of the present invention are described in more detail below with reference to the appended Figures.

DETAILED DESCRIPTION

Example embodiments of the present invention are described below with reference to a rotary encoder (see, e.g., FIG. 7) adapted to acquire an angular position between a scanning unit 1 and a scale element 2 or scale, which is rotatable relative thereto about an axis A. Scanning unit 1 has a metal frame 1.1, which may be produced from an aluminum alloy.

Figure 1:
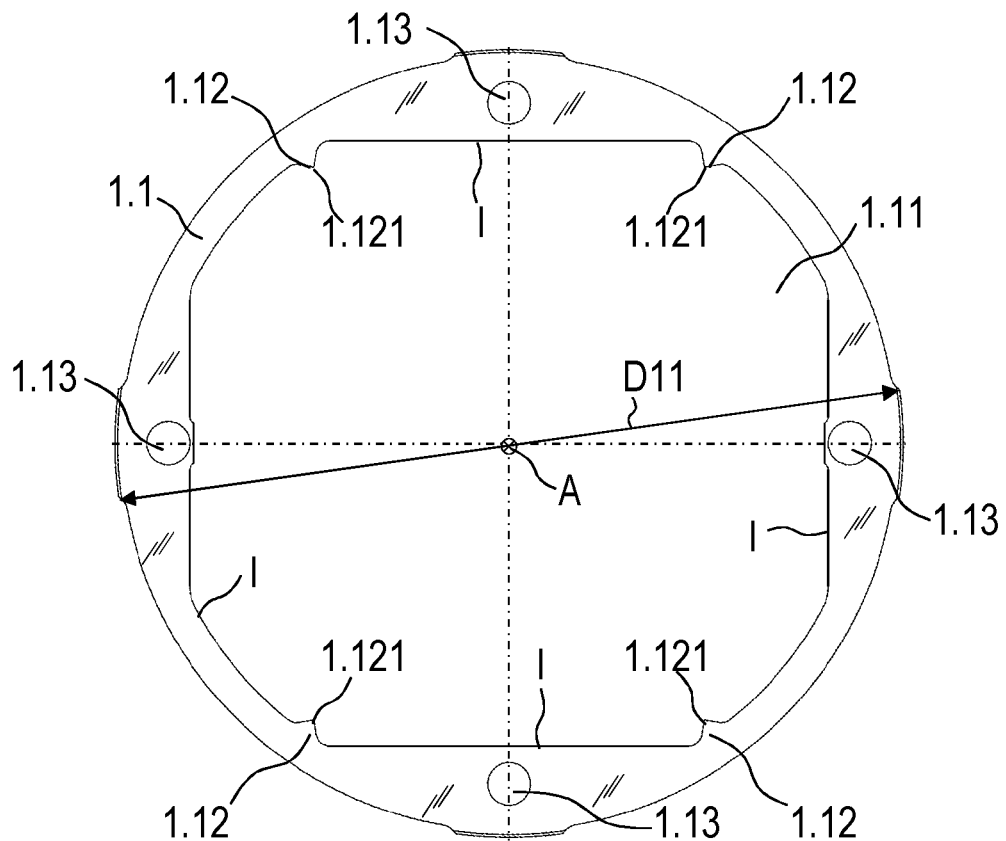
FIG. 1 is a top view of a metal frame of a scanning unit.
Figure 2:
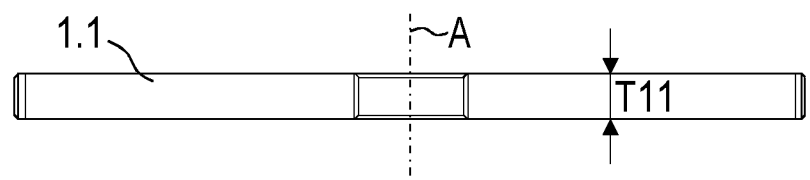
FIG. 2 is a side view of the metal frame of the scanning unit.

The configuration of metal frame 1.1 is described with reference to, for example, FIGS. 1 and 2. Metal frame 1.1 has a substantially annular outer contour and has a first extension D11 orthogonal to the axis, which corresponds to the maximum outer diameter of metal frame 1.1. Metal frame 1.1 is cut out of a flat plate having a thickness that corresponds to a second extension T11 of metal frame 1.1. Axis A is oriented orthogonal to metal frame 1.1 or to the end faces of metal frame 1.1. In addition, metal frame 1.1 has an axially uninterrupted first recess 1.11 so that metal frame 1.1 encloses uninterrupted first recess 1.11. First recess 1.11 is restricted by an inner side I of metal frame 1.1. Inner side I of metal frame 1.1 therefore is oriented parallel to axis A and surrounds axis A. This inner side I has four inwardly projecting elements 1.12, which are radially oriented in the direction of axis A, each having an edge 1.121 that extends in parallel with axis A. Inner side I has no step or projection that does not extend across the entire second extension T11 or across the entire thickness of metal frame 1.1. In other words, any step or projection provided on the inner side I extends across the entire second extension T11 or across the entire thickness of metal frame 1.1. As a result, uninterrupted first recess 1.11 is able to be produced by a punching process or a laser or water-jet cutting process, for example.

For the fastening on a machine part, metal frame 1.1 additionally has second recesses 1.13 arranged, for example, as fastening bores.

Metal frame 1.1 thus has an annular form or a disk shape. First extension D11 is, for example, 17.5 times greater than second extension T11. Lines that are substantially parallel to the axis may be positioned on inner side I of metal frame 1.1 or on first recess 1.11. Each of these lines has the same distance from axis A across second extension T11.

Figure 3:
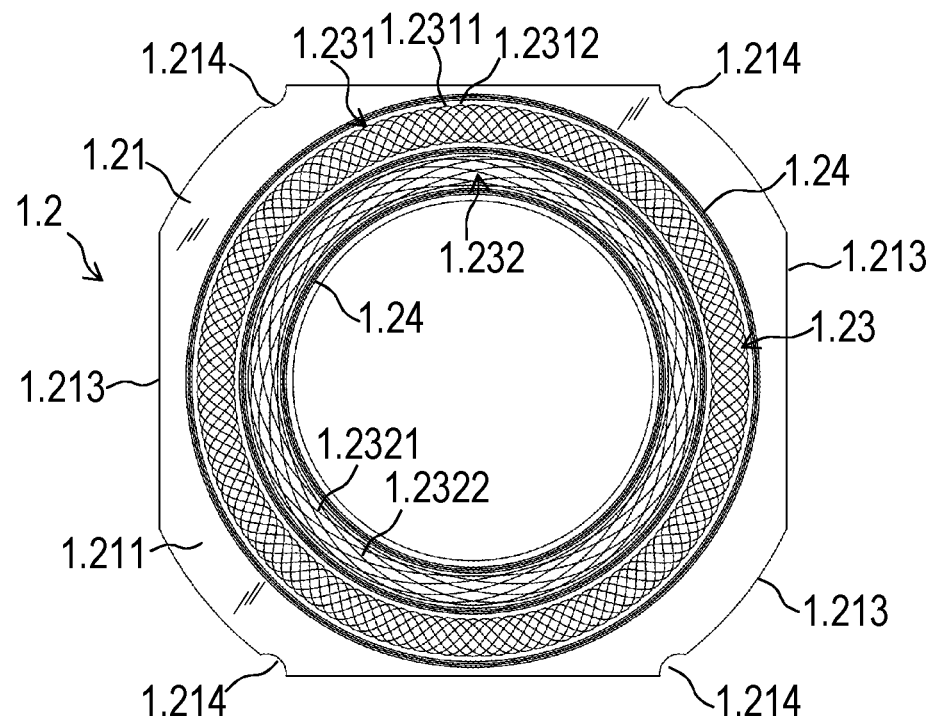
FIG. 3 is a plan view of a circuit board of the scanning unit.
Figure 4:
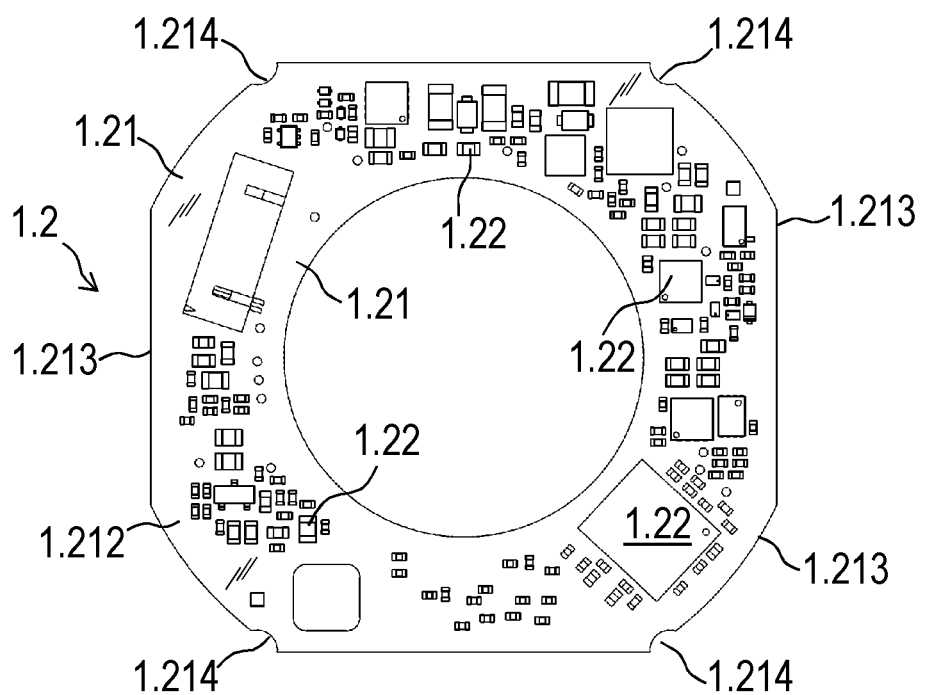
FIG. 4 is a plan view of the circuit board of the scanning unit on a side opposite the view of FIG. 3.

In addition, scanning unit 1 includes a circuit board 1.2. Circuit board 1.2 is illustrated in FIGS. 3 and 4, for example. Accordingly, circuit board 1.2 has a substrate 1.21 having, for example, multiple layers. Substrate 1.21 has a first surface 1.211 and a second surface 1.212, second surface 1.212 being arranged opposite first surface 1.211, and it has a circumferential third surface 1.213, which may also be referred to as lateral surface.

A transducer system 1.23 is arranged on first surface 1.211 as illustrated in FIG. 3. The rotary encoder is, for example, based on an inductive scanning principle so that transducer system 1.23 has two receiver tracks 1.231, 1.232, each receiver track 1.231, 1.232 having two receiver circuit traces 1.2311, 1.2312, 1.2321, 1.2322. Receiver circuit traces 1.2311, 1.2312, 1.2321, 1.2322 extend in different planes with through-vias so that undesired short circuits at junction points are avoided. In the illustrated exemplary embodiment, at least two layers are provided in the circuit-board or substrate structure. Receiver circuit traces 1.2311, 1.2312, 1.2321, 1.2322 have a spatially periodic characteristic, which has a sinusoidal or substantially sinusoidal configuration.

Receiver circuit traces 1.2311, 1.2312, 1.2321, 1.2322, which are part of the same receiver track 1.231, 1.232, are disposed at an offset from one another along the circumferential direction. Adjacent receiver circuit traces 1.2311, 1.2312, 1.2321, 1.2322 are arranged, for example, at an offset of ¼ of the full sine period (by $\pi/2$ or 90° along first direction x) from one another. Receiver circuit traces 1.2311, 1.2312, 1.2321, 1.2322 are electrically wired such that they are ultimately able to supply signals that are phase-shifted by 90° in the circumferential direction with regard to the position determination.

Moreover, scanning unit 1 includes excitation circuit traces 1.24, which are likewise arranged on first surface 1.211 and enclose receiver circuit traces 1.2311, 1.2312, 1.2321, 1.2322.

An electronic circuit is provided for the operation of excitation circuit traces 1.24 and for processing the signals received by receiver circuit traces 1.2311, 1.2312, 1.2321, 1.2322. Mounted on second surface 1.212 of circuit board 1.2, which is arranged opposite first surface 1.211, are electronic components 1.22 (for ease of understanding, only a few electronic components are provided with reference numerals in the Figures). These electronic components 1.22 are used for supplying excitation circuit traces 1.24 and for processing the received signals. In addition, an electrical coupling piece 1.221 for establishing a plug connection to a mating plug of a cable is mounted on second surface 1.212.

Moreover, circuit board 1.2 is provided with four concave indentations 1.214 on the lateral surface side, i.e., on its circumferential lateral surface.

Figure 5:
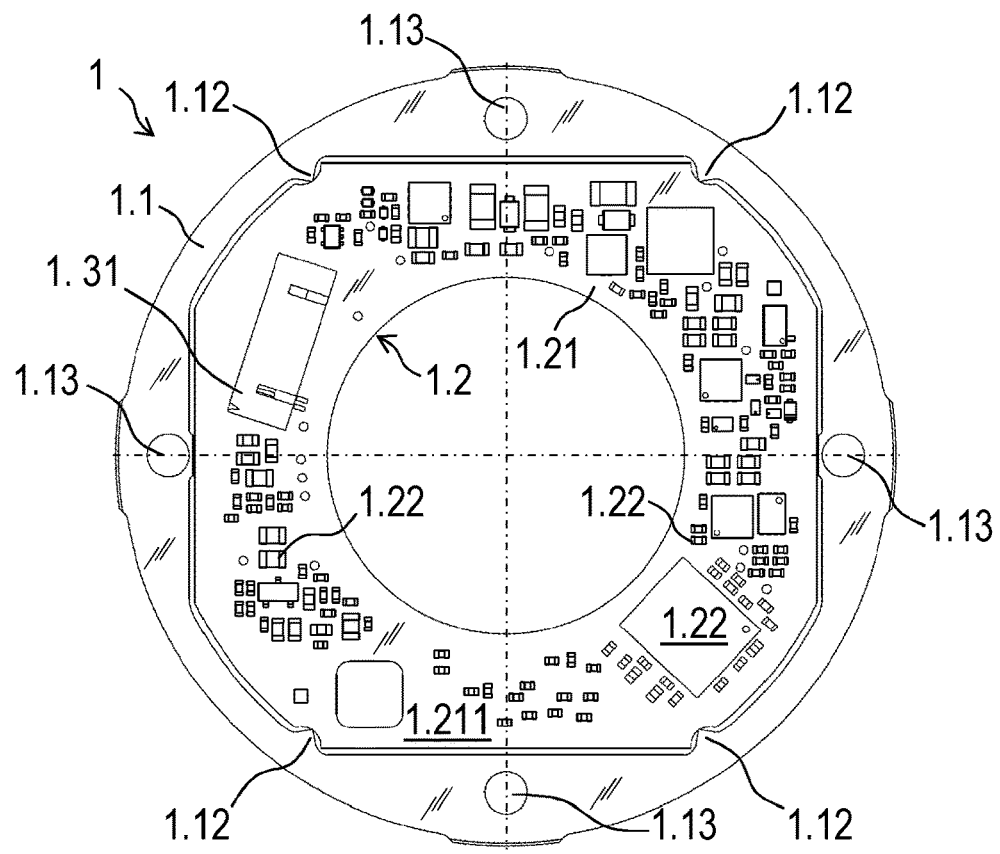
FIG. 5 is a top view of the scanning unit.

In the course of assembling scanning unit 1, circuit board 1.2 or substrate 1.21 is pressed into metal frame 1.1 so that edges 1.121 of projecting elements 1.12 engage into substrate 1.21 in the region of indentations 1.214 (see, e.g., FIG. 5). Substrate 1.21 thus has an excess size at the contact points with metal frame 1.1. Accordingly, projecting elements 1.12 engage with concave indentations 1.214 such that substrate 1.21 is fixed in place in metal frame 1.1 under mechanical tension. In this manner, circuit board 1.2 with transducer system 1.23 is precisely fixed in place relative to metal frame 1.1 or relative to second recesses 1.13 in all directions in space, which is important for measuring accuracy of the rotary encoder.

Figure 6:
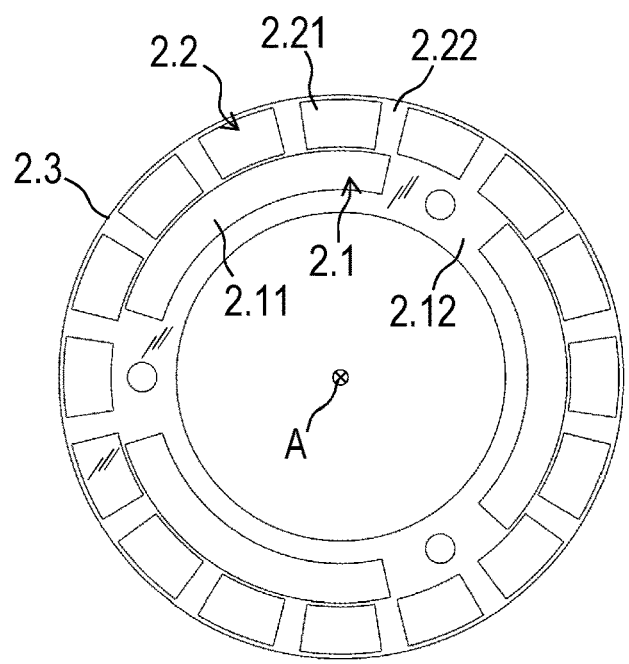
FIG. 6 is a top view of a scale element.

FIG. 6 is a top view of scale element 2. Scale element 2 includes a substrate 2.3, which is produced from epoxy resin, for example, and on which two graduation tracks 2.1, 2.2 are situated. Graduation tracks 2.1, 2.2 have an annular configuration and are arranged on the substrate with different diameters in a concentric fashion with regard to axis A. The two graduation tracks 2.1, 2.2 include a periodic sequence of alternatingly arranged electrically conductive graduation regions 2.11, 2.21 and non-conductive graduation regions 2.12, 2.22 in each case. In the illustrated example, copper is applied on substrate 2.3 as the material for electrically conductive graduation regions 2.11, 2.21. In contrast, no coating is applied to substrate 2.3 in non-conductive graduation regions 2.12, 2.22.

Figure 7:
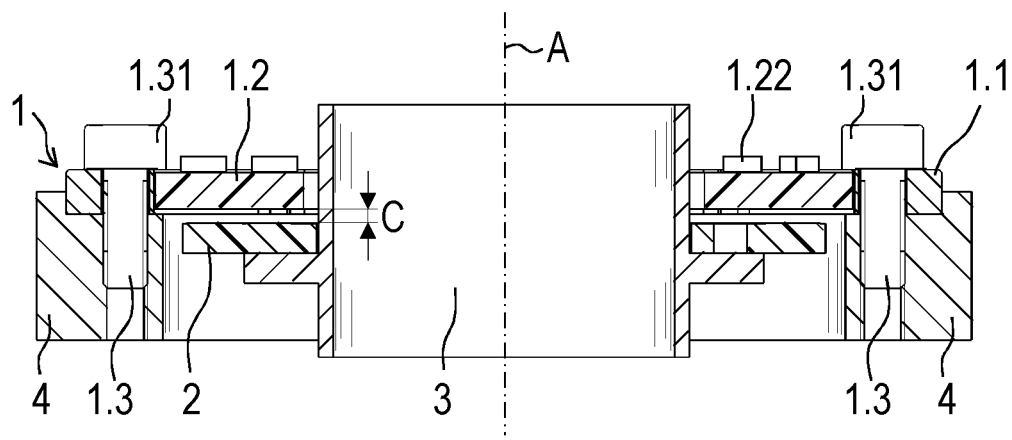
FIG. 7 is a cross-sectional view of a rotary encoder in the installed state.

FIG. 7 illustrates a rotary encoder, which includes scanning unit 1 and scale element 2. With the aid of fastening elements 1.3, which are arranged as screws, for example, scanning unit 1 is fixed in place on a first machine part 4, which is arranged as a flange, for example. For this purpose, fastening elements 1.3 are threaded through second recesses 1.13 so that they penetrate second recesses 1.13. In addition, fastening elements 1.3 have a section 1.31 which projects inward over substrate 1.21 and is the head of the screw, for example.

Figure 8:
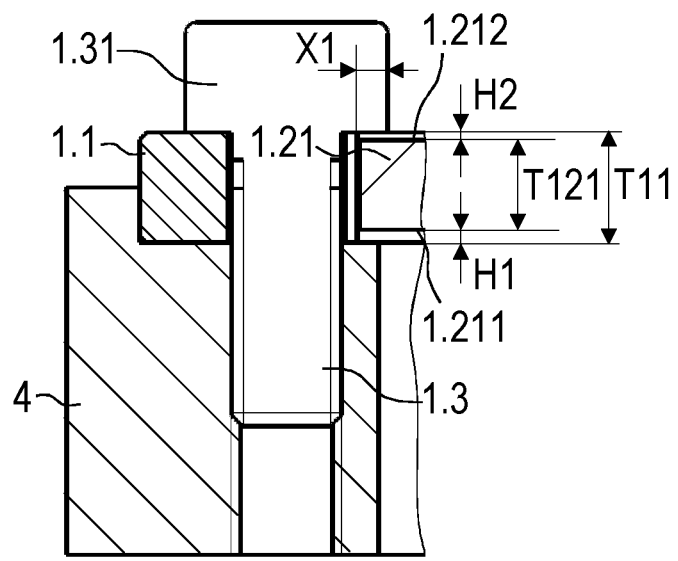
FIG. 8 is an enlarged cross-sectional view of the rotary encoder in the installed state.

As illustrated in FIG. 8, projecting section 1.31 projects beyond substrate 1.21 across a length X1. Fastening elements 1.3 therefore press metal frame 1.1 against flange 4 and simultaneously secure circuit board 1.2 in the axial direction.

During assembly of scanning unit 1, circuit board 1.2 or substrate 1.21 is pressed into metal frame 1.1 in the direction of axis A to precisely such an extent that metal frame 1.1 has a first axial projection H1 with respect to first surface 1.211 of substrate 1.21. First surface 1.211 of substrate 1.21 is the particular side of circuit board 1.2 on which transducer system 1.23 and excitation circuit traces 1.24 are arranged. First axial projection H1 relates to the end face of the metal frame and first surface 1.211 of substrate 1.21.

In addition, FIG. 8 illustrates that circuit board 1.2 is arranged in metal frame 1.1 such that metal frame 1.1 has a second axial projection H2 with respect to second surface 1.212 of substrate 1.21.

Metal frame 1.1 therefore has a greater second extension T11 in the direction of axis A than substrate 1.21, which has a third extension T121 in the direction of axis A. Substrate 1.21 consequently is completely surrounded by metal frame 1.1 or by inner side I of metal frame 1.1 and does not axially project beyond the outer contour of metal frame 1.1 at any point.

In the assembled state illustrated in FIG. 7, scanning unit 1 and scale element 2 are positioned opposite each other at an axial distance C or with an axial air gap. During assembly, axial projection H1 is readily but very precisely adjustable, for example, with the aid of suitable assembly devices using stops, so that desired distance C is likewise able to be readily adjusted with high precision. This increases the measuring accuracy of the rotary encoder.

In a relative rotation between scale element 2 and scanning unit 1, a signal as a function of the respective angular position is generated in transducer system 1.23 by induction effects, e.g., in receiver circuit traces 1.2311, 1.2312, 1.2321, 1.2322. A precondition for the production of corresponding signals is that excitation circuit traces 1.24 generate an electromagnetic excitation field that varies over time in the region of the scanned graduation structures. In the illustrated exemplary embodiment, excitation circuit traces 1.24 are arranged as a plurality of planar-parallel individual circuit traces through which a current flows. The electronic circuit of scanning unit 1 with electronic components 1.22 functions not only as an evaluation element but also as an exciter control element under whose control the excitation current is generated, which then flows through exciter circuit traces 1.24.

When exciter circuit traces 1.24 are energized, an electromagnetic field oriented in the form of a tube or a cylinder extends around respective exciter circuit trace 1.24. The field lines of the resulting electromagnetic field extend around exciter circuit traces 1.24 in the form of concentric circles, the direction of the field lines in, e.g., a conventional, manner depending on the current direction in exciter circuit traces 1.24. In the region of electrically conductive graduation regions 2.11, 2.21, eddy currents are induced so that a modulation of the field as a function of the angular position is achieved. Accordingly, receiver tracks 1.231, 1.232 are able to measure the relative angular position in relation to axis A as the axis of rotation. The pairs of receiver circuit traces 1.2311, 1.2312, 1.2321, 1.2322 are arranged within their receiver track 1.231, 1.232 such that they supply signals which are offset by 90° in their phase in each case so that a determination of the direction of rotation is also able to be performed.

What is claimed is:

1. A scanning unit for scanning a scale element rotatable relative to the scanning unit about an axis, comprising:
    a metal frame having an uninterrupted first recess radially bounded by an inner side of the metal frame, the inner side including a plurality of inwardly projecting elements; and
    a circuit board including a substrate having a first surface, a second surface arranged opposite the first surface, a circumferential third surface having a plurality of concave indentations, a transducer system arranged on the first surface, and electronic components arranged on the second surface;

wherein the inner side of the metal frame encloses the indentations of the substrate, and the inwardly projecting elements engage with the indentations of the substrate to fix the substrate in place in the metal frame under mechanical tension.

2. The scanning unit according to claim 1, wherein each of the inwardly projecting elements includes an edge that extends in parallel with the axis.

3. The scanning unit according to claim 1, wherein the metal frame is disk-shaped.

4. The scanning unit according to claim 1, wherein the metal frame has a first dimension in a direction perpendicular to the axis and a second dimension in a direction of the axis, the first dimension being at least five times greater than the second dimension.

5. The scanning unit according to claim 1, wherein the circuit board is arranged in the metal frame such that the metal frame has a first axial projection in relation to the first surface of the substrate.

6. The scanning unit according to claim 5, wherein the circuit board is arranged in the metal frame such that the metal frame has a second axial projection in relation to the second surface of the substrate.

7. The scanning unit according to claim 1, wherein the metal frame includes second recesses adapted for fastening the metal frame to a machine part.

8. The scanning unit according to claim 7, further comprising fasteners that penetrate the second recesses, each fastener having a section that projects inwardly over the substrate.

9. The scanning unit according to claim 1, wherein the metal frame has a second dimension in a direction of the axis, and the substrate has a third dimension in the direction of the axis, the second dimension being greater than the third dimension.

10. The scanning unit according to claim 4, wherein the substrate has a third dimension in the direction of the axis, the second dimension being greater than the third dimension.

11. The scanning unit according to claim 1, wherein the transducer system includes two receiver tracks, each receiver track having two receiver circuit traces.

12. The scanning unit according to claim 11, wherein each receiver circuit trace has a substantially sinusoidal configuration.

13. The scanning unit according to claim 11, wherein adjacent receiver circuit traces are arranged at an offset from one another.

14. The scanning unit according to claim 11, wherein adjacent receiver circuit traces are arranged at a 90° offset from one another.

15. The scanning unit according to claim 14, wherein the receiver circuit traces are adapted to supply signals that are phase-shifted by 90°.

16. The scanning unit according to claim 11, wherein excitation circuit traces are arranged on the first surface of the substrate and enclose the receiver circuit traces.

17. The scanning unit according to claim 16, further comprising an electronic circuit adapted to energize the excitation circuit traces and to process signals received by the receiver circuit traces.

18. The scanning unit according to claim 1, wherein the scanning unit is adapted to scan the scale element of a rotary encoder, the first surface being arranged opposite the scale element at a predetermined distance in a direction of the axis.

19. A rotary encoder, comprising:
a scale element; and
a scanning unit adapted to scan the scale element, the scale element being rotatable relative to the scanning unit about an axis, the scanning unit including:
  a metal frame having an uninterrupted first recess radially bounded by an inner side of the metal frame, the inner side including a plurality of inwardly projecting elements; and
  a circuit board including a substrate having a first surface, a second surface arranged opposite the first surface, a circumferential third surface having a plurality of concave indentations, a transducer system arranged on the first surface, and electronic components arranged on the second surface;
wherein the inner side of the metal frame encloses the indentations of the substrate, and the inwardly projecting elements engage with the indentations of the substrate to fix the substrate in place in the metal frame under mechanical tension; and
wherein the first surface is arranged opposite the scale element at a predetermined distance in a direction of the axis.

20. The rotary encoder according to claim 19, wherein the rotary encoder is arranged as a bearingless rotary encoder.

21. The scanning unit according to claim 1, wherein the circuit board in arranged in the first recess.

22. The rotary encoder according to claim 19, wherein the circuit board in arranged in the first recess.

* * * * *